United States Patent Office 3,476,712
Patented Nov. 4, 1969

3,476,712
PROCESS FOR PRODUCING NOVEL
POLYESTER AMIDES
Kenichi Fukui and Tsutomu Kagiya, Kyoto, Shizuo Narisawa, Taneo Maeda, and Mikio Kobata, Ibaraki-shi, Japan, assignors to Sumitomo Chemical Company, Ltd., Higashi-ku, Osaka, Japan, a corporation of Japan
Filed Sept. 26, 1966, Ser. No. 581,929
Claims priority, application Japan, Sept. 30, 1965, 40/60,088
Int. Cl. C08g 17/017, 20/30
U.S. Cl. 260—78
4 Claims

ABSTRACT OF THE DISCLOSURE

A novel polyesteramide having the unit structure recurring units represented by the formula:

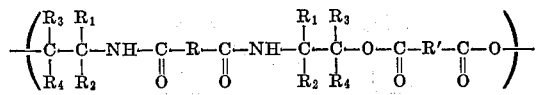

Figure 1:
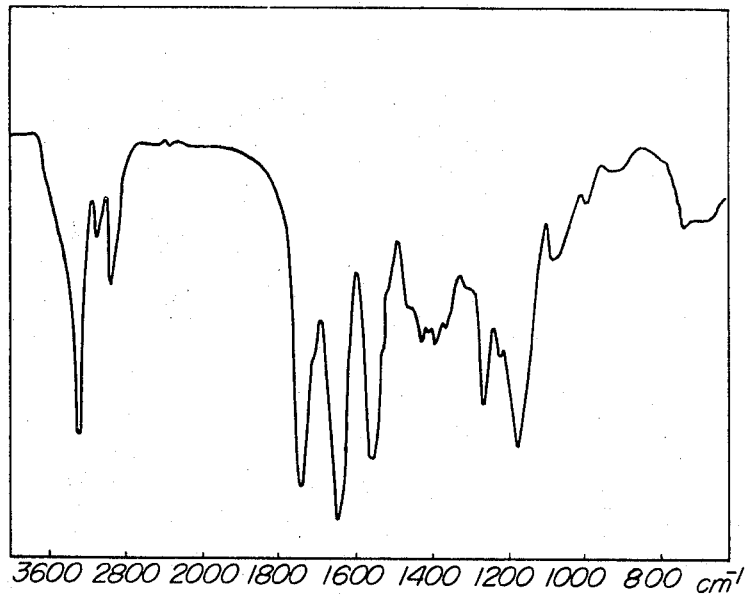
Figure 2:
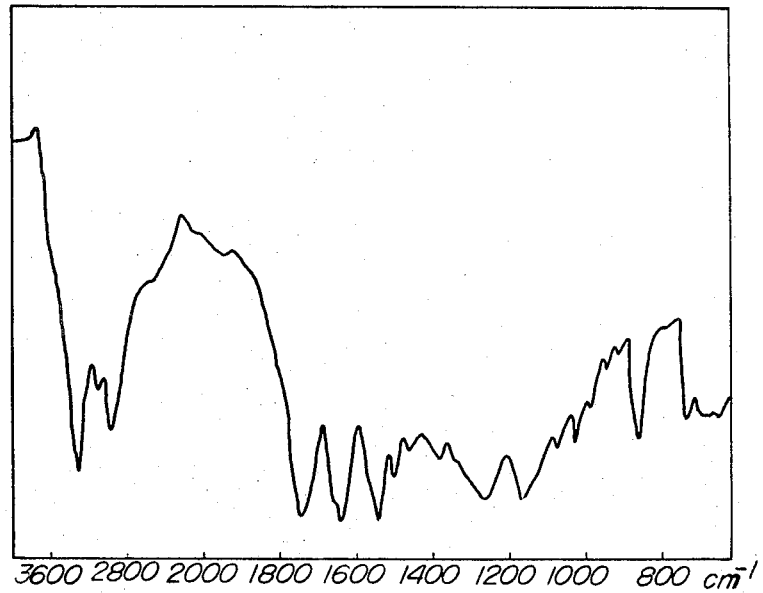

wherein $R_1$, $R_2$, $R_3$ and $R_4$ each are hydrogen atoms or hydrocarbon groups, R is a divalent hydrocarbon group, and $R'$ is a divalent hydrocarbon group which may be the same or different from R, and is prepared by reacting a bis-2-oxazoline compound having the formula:

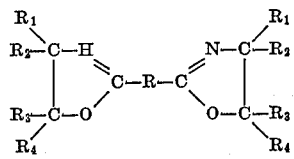

wherein R, $R_1$, $R_2$, $R_3$ and $R_4$ are the same as defined above, with a dicarboxylic acid represented by the formula: HOOC—$R'$—COOH in which $R'$ in the same as defined above, in equimolar amounts at a temperature of 50° to 250° C. Said polyesteramide can be used as the starting material for synthetic fibers, plastics and the like.

---

This invention relates to producing novel polyester amides.

It is known that a 2-oxazoline compound reacts with a carboxylic acid to produce a compound possessing both amide and ester bonds through the ring opening between the 1- and 5-positions of the oxazoline. (E. M. Fry, Journal of Organic Chemistry, vol. 15, page 802 (1950).)

The present inventors studied about the reactions of various kinds of 2-oxazoline compounds and various kinds of carboxylic acid compounds and also about the products synthesized by the reactions, and found that a polyaddition reaction of a bis-2-oxazoline and dicarboxylic acid produces a novel and linear polyester amide. Further the present inventors found that the said polyester amide compounds are crystalline polymers.

The present invention provides a process for producing polyester amides having the unit structure represented by the following formula,

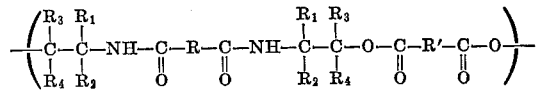

wherein R is a divalent hydrocarbon group; $R_1$, $R_2$, $R_3$ and $R_4$ are individually hydrogen or hydrocarbon group; and $R'$ is a hydrocarbon group identical with or different from said R, which comprises reacting a bis-2-oxazoline compound having the general formula,

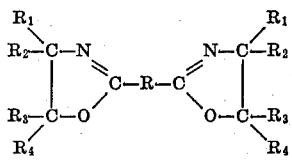

wherein R, $R_1$, $R_2$, $R_3$ and $R_4$ have the same meanings as identified above, with a dicarboxylic acid having the general formula,

HOOC—$R'$—COOH wherein $R'$ has the same meaning as identified above.

The present polyester amides are novel and the present polyester amides are useful to make synthetic fibers, plastics and the like.

The production of the novel polyester amides of the present invention is effected by mixing in a molar ratio of 1:1 a bis-2-oxazoline compound with a dicarboxylic acid compound in the presence or absence of a proper solvent and heating the mixture at 50°–250° C.

After the reaction is over, where the reaction is carried out in the presence of a solvent, the reaction mixture is cooled and then the precipitates are deposited with addition of a suitable solvent which does not dissolve the precipitates. The resulting precipitates are collected by filtration and dried under reduced pressure, and the polyester amides are thus obtained.

In accordance with the process of the present invention, bis-2-oxazoline may be one or more kinds of bis-2-oxazolines and also the dicarboxylic acid may be one or more kinds of dicarboxylic acids, and as the result a wide variety of polyester amides can be synthesized.

The dicarboxylic acids to be used may be any of aliphatic and aromatic dicarboxylic acids, and include saturated dicarboxylic acids such as malonic, succinic, glutaric, adipic, pimelic, suberic, azelaic and sebacic acids, and derivatives thereof; unsaturated dicarboxylic acids such as maleic, fumaric and itaconic acids, and derivatives thereof; alicyclic dicarboxylic acids such as 1,4-trans-cyclohexane dicarboxylic acid and the like, and derivatives thereof; and aromatic dicarboxylic acids such as phthalic, isophthalic, terephthalic, 4-methylisophthalic, diphenylmethane-4,4'-dicarboxylic, 1,2-diphenylpropane-4,4'-dicarboxylic, biphenyl-4,4'-dicarboxylic and dibenzyl-4,4'-dicarboxylic acids, and derivatives thereof.

Bis-2-oxazoline compounds to be used in the process of the present invention include, for example, 2,2'-methylene-bis (2-oxazoline), 2,2'-ethylene-bis (2-oxazoline), 2,2'-trimethylene-bis (2-oxazoline), 2,2'-tetramethylene-bis (2-oxazoline), 2,2'-hexamethylene-bis (2-oxazoline), 2,2'-octamethylene-bis (2-oxazoline), 2,2'-ethylene-bis-(4-methyl-2-oxazoline), 2,2'-ethylene-bis (4,4-dimethyl-2-oxazoline), 2,2'-ethylene-bis (5-methyl-2-oxazoline), 2,2'-p-phenylene-bis (2-oxazoline), 2,2'-m-phenylene-bis (2-oxazoline), 2,2'-o-phenylene-bis (2-oxazoline), 2,2'-tolylene-2,4-bis (2-oxazoline), 2,2'-p,p'-diphenylmethane-bis (2-oxazoline), 2,2'-p,p'-diphenyl-2,2-propane-bis (2-oxazoline) and 2,2'-diphenylene-bis (2-oxazoline).

These bis-2-oxazolines can be synthesized according to the procedures described in the literatures, for example U.S. Patent Numbers 2,924,571 and 2,569,428.

As the reaction solvents, there are used those which scarcely react with the 2-oxazoline compounds and dicarboxylic acid compounds. Such solvents include, for example, hydrocarbons and halogenated hydrocarbons such as heptane, benzene, toluene, xylene and chlorobenzene; ethers such as dioxane, tetrahydrofuran and anisole; ketones such as cyclohexanone; amides such as N,N-dimethylformamide and N,N-dimethylacetamide; and nitriles such as acetonitrile.

The following examples illustrate the process of the present invention, but the examples are only illustrative and do not limit the scope of the invention.

EXAMPLE 1

A solution of 1.68 g. of 2,2'-ethylene-bis (2-oxazoline) and 1.46 g. of adipic acid in 10 ml. of N,N-dimethylformamide was sealed in a test tube of 21 mm. in inner diameter. The solution was heated and reacted at 120° C. for 10 hours, after cooling the precipitates were deposited with addition of acetone, collected by filtration, and then dried under reduced pressure to obtain 0.76 g. of a brown powdery product, yield 24.2%.

The thus obtained product was soluble in N,N-dimethylformamide and formic acid, and was insoluble in benzene, acetone, alcohol, chloroform and water. The melting point of the product was 145°–155° C., and the reduced viscosity thereof measured at 35° C. in N,N-dimethylformamide solution at a concentration of 0.25 g./100 ml. was 0.07.

The elementary analysis values of said product were as follows:

Elementary analysis.—Calculated for $C_{14}H_{22}N_2O_6$: C, 53.50%; H, 7.06%; N, 8.91%. Found: C, 52.51%; H, 7.80%; N, 9.10%.

Infrared absorption spectrum of said product, measured according to potassium bromide pellet technique, showed absorptions of 3290, 3080, 1639 and 1553 cm.$^{-1}$ due to the CONH linkage, and absorptions of 1738 and 1175 cm.$^{-1}$ due to the COO linkage, and the structure of the product is considered to have the unit structure represented by the following formula,

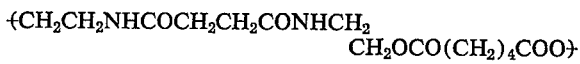

X-ray diffraction pattern of said product, measured with a powder camera, showed a crystalline peak at $2\theta=22.1°$, and thus the product was a crystalline polymer.

EXAMPLE 2

A solution of 1.08 g. of 2,2'-p-phenylene-bis (2-oxazoline) and 0.73 g. of adipic acid were dissolved in 10 ml. of N,N-dimethylformamide, and the solution was sealed in a test tube of 21 mm. in diameter. The solution was heated and reacted at 120° C. for 10 hours, after cooling the precipitates were deposited with addition of ethyl ether, collected by filtration and then dried under reduced pressure to obtain 1.10 g. of a brown powdery product, yield 60.8%. The thus obtained product was soluble in N,N-dimethylformamide and formic acid, and was insoluble in benzene, acetone, chloroform, alcohol and water. The melting point of the product was 217°–220° C., and the reduced viscosity thereof measured at 35° C. in N,N-dimethylformamide solution at a concentration of 0.25 g./100 ml. was 0.07. The elementary analysis values of said product were as follows:

Calculated for $C_{18}H_{22}N_2O_6$: N, 7.73%. Found, N, 7.99%.

Infrared absorption spectrum of said product, measured according to potassium bromide pellet technique, showed absorptions of 3290, 3060, 1635 and 1545 cm.$^{-1}$ due to the CONH linkage, absorptions of 1735 and 1165 cm.$^{-1}$ due to the COO linkage, and absorptions of 1565, 1500, 1460, 1109 and 861 cm.$^{-1}$ due to the 1,4-substituted benzene nucleus, and the unit structure of the product was considered to have the unit structure represented by the following formula:

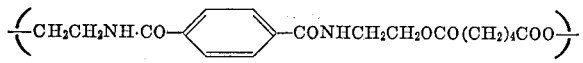

X-ray diffraction pattern of the above product, measured with a powder camera, showed crystalline peaks at $2\theta=18.6°$ and 22.65°, and the product was a crystalline polymer.

What we claim is:

1. A process for producing a solid polyester amide which comprises reaction in a molar ratio of 1:1 a bis-2-oxazoline compound having the formula:

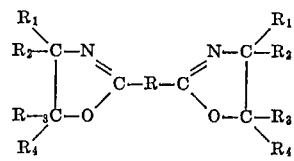

wherein R is a divalent hydrocarbon group; $R_1$, $R_2$, $R_3$ and $R_4$ are individually hydrogen or hydrocarbon groups; with a dicarboxylic acid having the formula:

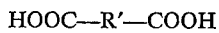

wherein R' is a divalent hydrocarbon group identical with or different from said R, at a temperature of 50° to 250° C.

2. A process according to claim 1, wherein the bis-2-oxazoline compound is 2,2'-ethylene-bis-(2-oxazoline).

3. A process according to claim 1, wherein the bis-2-oxazoline compound is 2,2'-para-phenylene-bis-(2-oxazoline).

4. A process according to claim 1, wherein the dicarboxylic acid is adipic acid.

References Cited

UNITED STATES PATENTS

| | | | |
|---|---|---|---|
| 2,386,454 | 10/1945 | Frosch | 260—78 |
| 2,396,248 | 3/1946 | Christ | 260—78 |
| 2,463,977 | 3/1949 | Kropa | 260—78 |
| 3,153,017 | 10/1964 | Caldwell et al. | 260—78 |
| 3,216,974 | 11/1965 | Van Gijzen | 260—78 |
| 3,272,774 | 9/1966 | Moyer | 260—78 |
| 3,272,776 | 9/1966 | Caldwell | 260—78 |

HAROLD D. ANDERSON, Primary Examiner

U.S. Cl. X.R.

260—31.2, 32.6, 78.4